United States Patent
Liotta et al.

(10) Patent No.: US 12,004,500 B1
(45) Date of Patent: Jun. 11, 2024

(54) FLY TRAP DEVICE AND METHOD OF USE

(71) Applicants: Paul Liotta, Alexandria, LA (US);
Zachary L McPherson, Fort Worth, TX (US)

(72) Inventors: Paul Liotta, Alexandria, LA (US);
Zachary L McPherson, Fort Worth, TX (US)

( * ) Notice: Subject to any disclaimer, the term of this patent is extended or adjusted under 35 U.S.C. 154(b) by 156 days.

(21) Appl. No.: 17/853,391

(22) Filed: Jun. 29, 2022

Related U.S. Application Data

(63) Continuation-in-part of application No. 17/510,106, filed on Oct. 25, 2021, now abandoned.

(60) Provisional application No. 63/237,387, filed on Aug. 26, 2021.

(51) Int. Cl.
*A01M 1/10* (2006.01)
*A01M 1/02* (2006.01)
*A01M 1/12* (2006.01)

(52) U.S. Cl.
CPC ............. *A01M 1/106* (2013.01); *A01M 1/026* (2013.01); *A01M 1/12* (2013.01)

(58) Field of Classification Search
CPC .............................. A01M 1/026; A01M 1/106
USPC ..................................................... 43/111–113
See application file for complete search history.

(56) References Cited

U.S. PATENT DOCUMENTS

| | | | | | |
|---|---|---|---|---|---|
| 632,313 | A | * | 9/1899 | Lane | A01M 1/106 43/111 |
| 2,490,498 | A | * | 12/1949 | Wisen | A01M 1/02 241/222 |
| 5,327,675 | A | * | 7/1994 | Butler | A01M 1/14 43/107 |
| 5,369,908 | A | * | 12/1994 | Morales | A01M 1/02 43/111 |
| 5,425,197 | A | * | 6/1995 | Smith | A01M 1/14 43/113 |
| 6,134,826 | A | * | 10/2000 | Mah | A01M 1/223 43/99 |
| 6,305,122 | B1 | * | 10/2001 | Iwao | A01M 1/145 43/112 |
| 6,718,688 | B2 | * | 4/2004 | Garretson | A01M 1/103 43/73 |

(Continued)

FOREIGN PATENT DOCUMENTS

| CA | 2460876 C * 8/2009 | ............. A01M 1/02 |
|---|---|---|
| WO | WO-0011944 A1 * 3/2000 | ............. A01M 1/023 |
| WO | WO-2007146332 A2 * 12/2007 | ............. A01M 1/023 |

OTHER PUBLICATIONS

Merged translation of WO-0011944-A1 (Year: 2000).*
Merged translation of WO-2007146332-A2 (Year: 2007).*
Merged translation of CA-2460876-C (Year: 2009).*

*Primary Examiner* — Morgan T Jordan
(74) *Attorney, Agent, or Firm* — Richard Eldredge; Leavitt Eldredge Law Firm

(57) ABSTRACT

A fly trap device that traps insects and processes said trapped insects for storage and disposal is disclosed. In some embodiments, the fly trap device includes a trap body removably coupled to a main body; wherein the trap body includes a relatively horizontal top portion, a conical shaped bottom portion, a cylindrical sidewall, and an interior cavity; wherein the main body includes a grinding auger section and a collection tray. In other embodiments, the fly trap device includes one or more electrodes configured to disable trapped insects, an air filtration system, and a disposal pod.

17 Claims, 12 Drawing Sheets

(56) References Cited

U.S. PATENT DOCUMENTS

| | | | |
|---|---|---|---|
| 11,684,057 B2* | 6/2023 | Ali | A01M 1/12 43/111 |
| 2002/0056223 A1* | 5/2002 | Garretson | A01M 1/103 43/121 |
| 2005/0126068 A1* | 6/2005 | Welch | A01M 1/223 43/112 |
| 2005/0252075 A1* | 11/2005 | Achor | A01M 1/06 43/139 |
| 2007/0056207 A1* | 3/2007 | Chen | A01M 1/026 43/107 |
| 2011/0030266 A1* | 2/2011 | Roy | A01M 1/08 43/113 |
| 2011/0099885 A1* | 5/2011 | Maganga | A01M 1/14 43/112 |
| 2014/0165452 A1* | 6/2014 | Rocha | A01M 1/08 43/139 |
| 2018/0000093 A1* | 1/2018 | Nchekwube | A01M 1/226 |
| 2020/0196587 A1* | 6/2020 | Smith | A01M 1/06 |

* cited by examiner

FLY TRAP DEVICE AND METHOD OF USE

CROSS REFERENCE TO RELATED APPLICATIONS

This application is a continuation of U.S. application Ser. No. 17/510,106, filed on Oct. 25, 2021, which claims priority to U.S. Provisional Patent Application No. 63/237,387, filed on Aug. 26, 2021. Each of the aforementioned applications is incorporated herein by reference in its entirety.

BACKGROUND

1. Field of the Invention

The present invention relates generally to fly trap systems, and more specifically to a fly trap device for trapping insects and then incapacitating, dehydrating, and grinding the trapped insects for easy storage and disposal.

2. Description of Related Art

Fly trap systems are well known in the art and are effective means for attracting and killing insects. Commonly in the art, fly trap systems utilize various attractants such as light, heat, motion, and scent to attract insects to an electrocution device, commonly referred to as "bug zappers", where the insects are exterminated.

One of the problems commonly associated with these bug zappers is their limited efficiency. For example, conventional bug zappers utilize high voltage to kill insects which violently destroys the insect and results with a wide blast radius, making it cumbersome to clean. Moreover, the dispersed insect parts resulting from the blast can pose a potential health risk depending on where the insect parts settle, especially in areas that handle food designated for consumption.

Accordingly, is an object of the present invention to provide a device that utilizes low voltage to incapacitate an insect and then creates a sterile environment for safe and easy storage and disposal of the insect.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
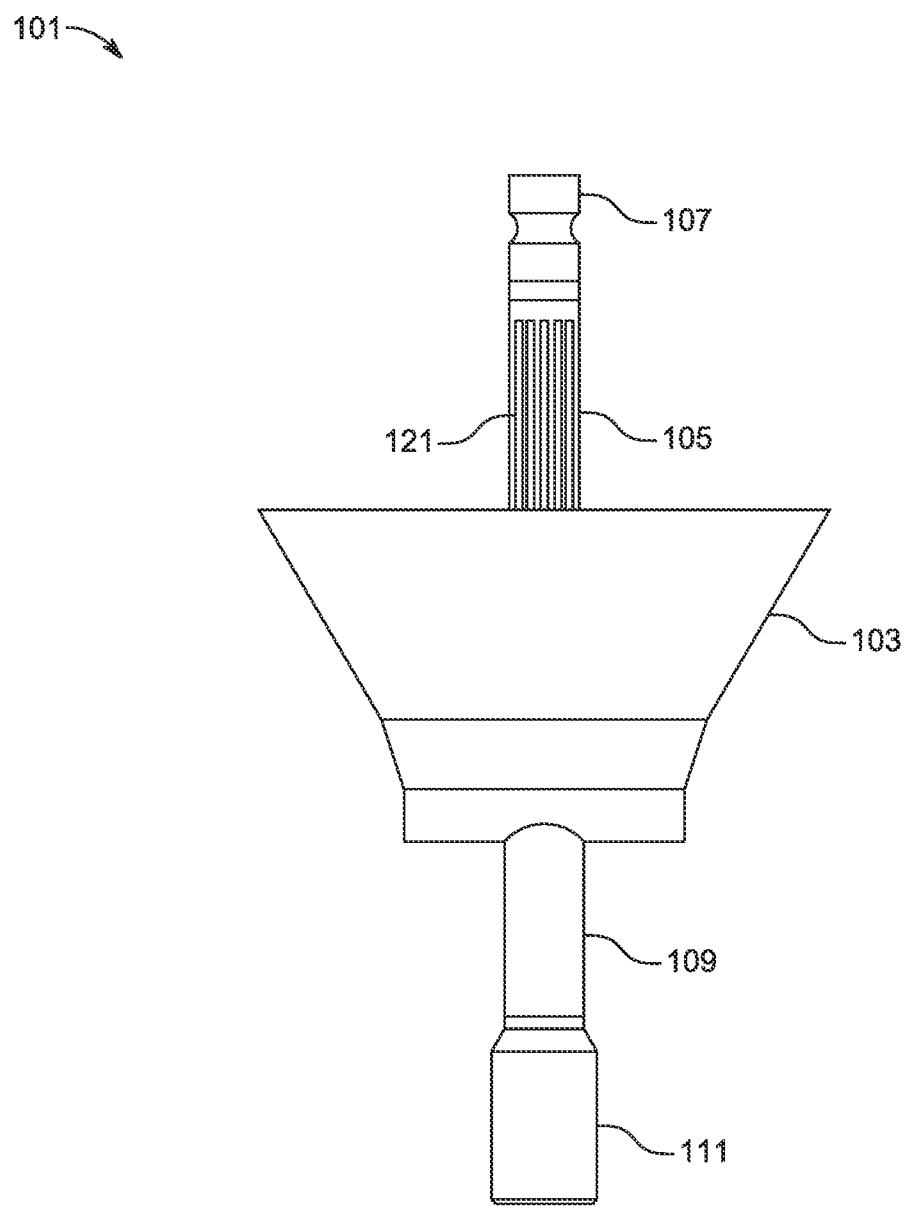
FIG. 1A is a front view of a fly trap device in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional fly trap systems. Specifically, the present invention provides for an easy and sanitary means for the trapping and disposing of insects. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1B:
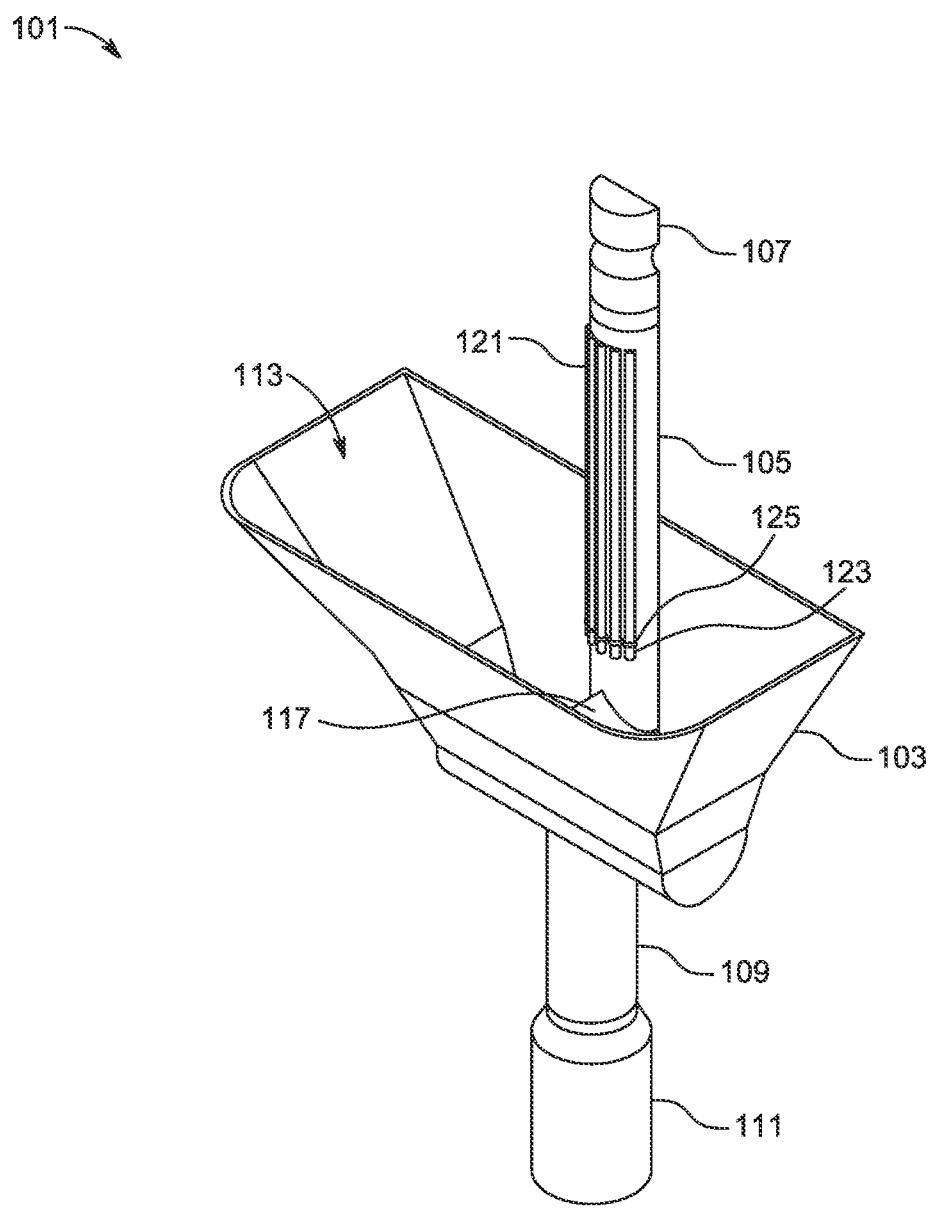
FIG. 1B is a perspective view of the fly trap device of FIG. 1A.
Figure 1C:
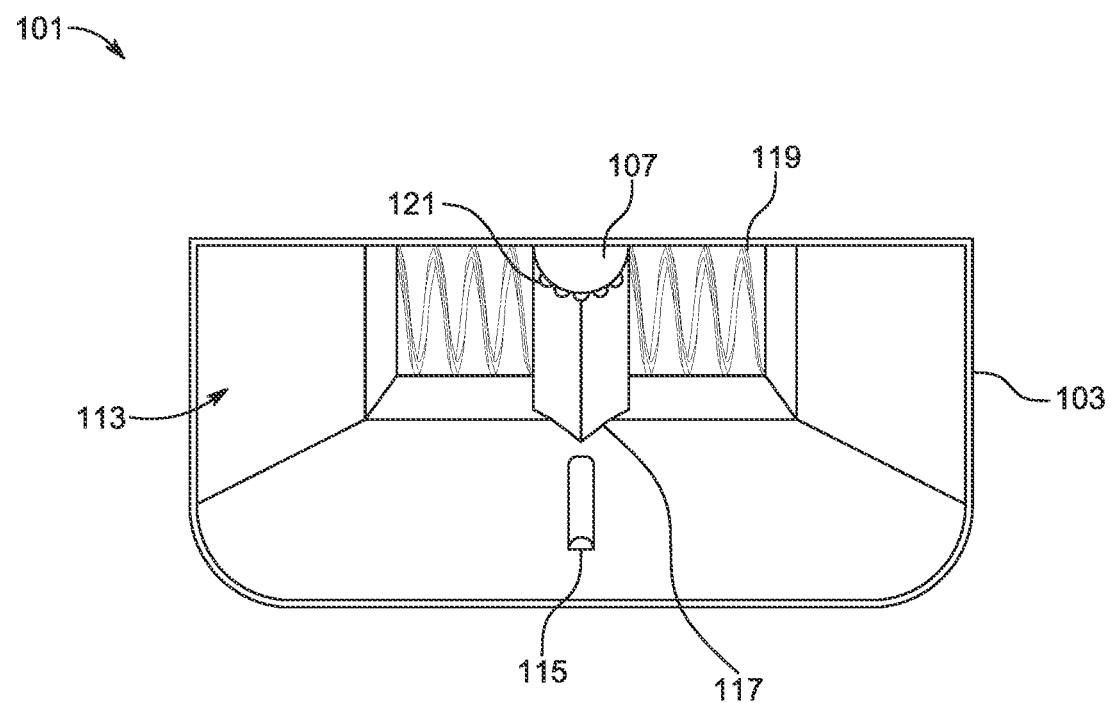
FIG. 1C is a top view of the fly trap device of FIG. 1A.

Referring now to the drawings wherein like reference characters identify corresponding or similar elements throughout the several views, FIGS. 1A through 1C depict various views of a fly trap device 101 in accordance with a preferred embodiment of the present application. It will be appreciated that the fly trap device 101 overcomes one or more of the above-listed problems commonly associated with conventional fly trap systems.

In the contemplated embodiment, the fly trap device 101 includes a body 103, a vertical column 105, an oil cartridge 107, a grinding auger section 109, and a disposal pod 111. The body includes an interior cavity 113 having a light source 115, an electronic hood 117, and a conveyance auger 119 therein. In the preferred embodiment, the light source 115 is ultraviolet light. It should be appreciated that the light source 115 provides for an attractant to lure insects to the fly trap device 101 as well as to disinfect the interior cavity 113. The conveyance auger 119 is configured to transport insect remains into the grinding auger section 109.

The vertical column 105 extends upwardly from the interior cavity 113. The vertical column 105 is configured to house one or more electrodes 121 and one or more oil wicks 301 (not shown, see FIG. 3) therein. The one or more electrodes 121 are configured to deliver low voltage alternating current. It should be appreciated that the low voltage alternating current disables or otherwise incapacitates insects upon contact with the one or more electrodes 121.

The vertical column 105 also includes an oil reservoir 123 having a lip 125, the oil reservoir 123 configured to receive and hold the one or more oil wicks 301 therein. The one or more oil wicks 301 are arranged to be in direct communication with the one or more electrodes 121. It should be appreciated that when oil diffuses along the one or more oil wicks 301, the oil aids in the conductivity of the low voltage alternating current to the insect.

Figure 3:
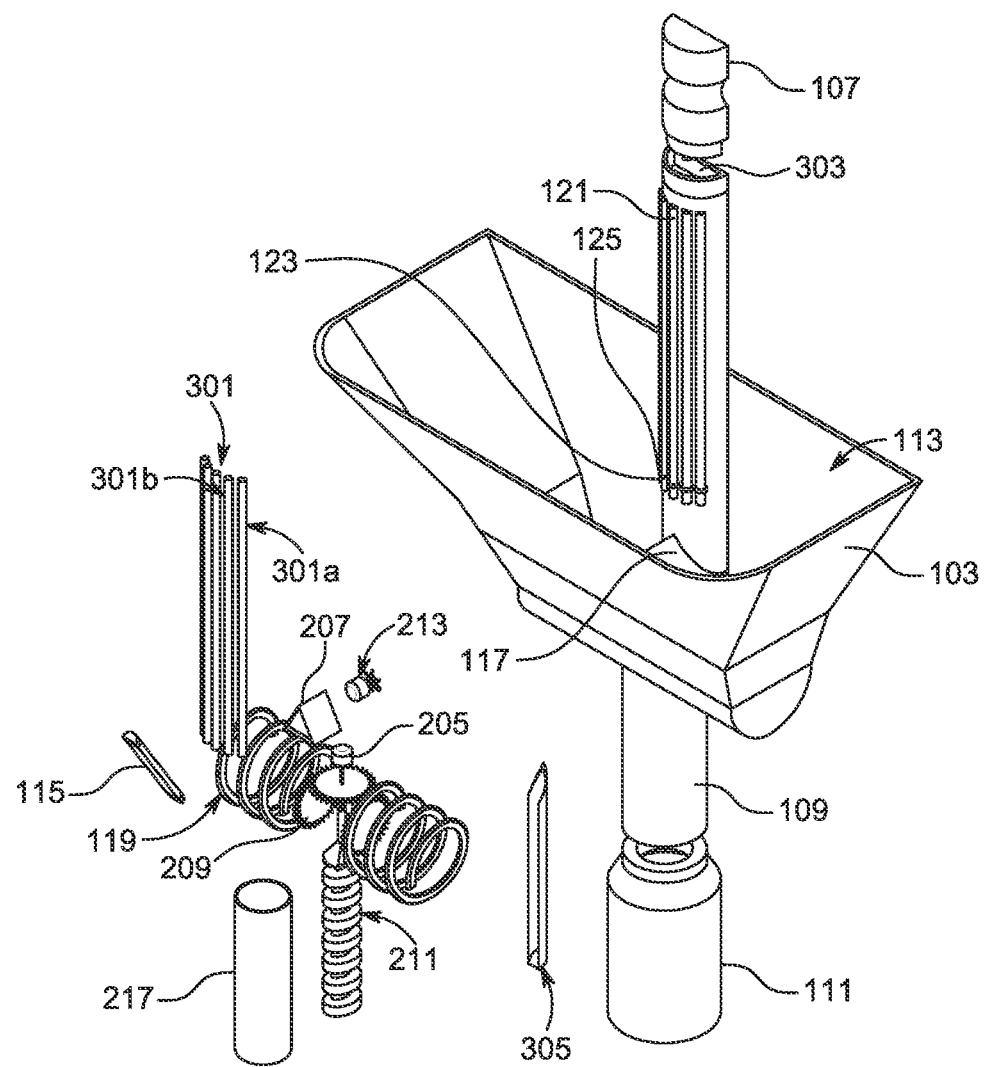
FIG. 3 is an exploded view of the fly trap device of FIGS. 1A-1C.

The oil cartridge 107 is removably coupled to the top portion of the vertical column 105 via a socket 303 (not shown, see FIG. 3). The oil cartridge 107 is configured to house oil (not shown) therein. In the preferred embodiment, the oil is scented to attract insects.

In some embodiments, the oil reservoir 123 can be a liquid reservoir, fluid reservoir, or a combination thereof. Similarly, the oil wicks 301 can be liquid wicks, fluid wicks, or a combination thereof. Likewise, the oil cartridge 107 can be a liquid cartridge, a fluid cartridge, or a combination thereof.

The grinding auger section 109 couples to the bottom portion of the body 103. The grinding auger section 109 is configured to grind and dehydrate insects that fall into the interior cavity 105.

The disposal pod 111 removably couples to the bottom portion of the grinding auger section 109. The disposal pod 111 is configured to store insect remains after insects are ground and dehydrated within the grinding auger section 109. In the preferred embodiment, the disposal pod 111 is made of bamboo.

Figure 2:
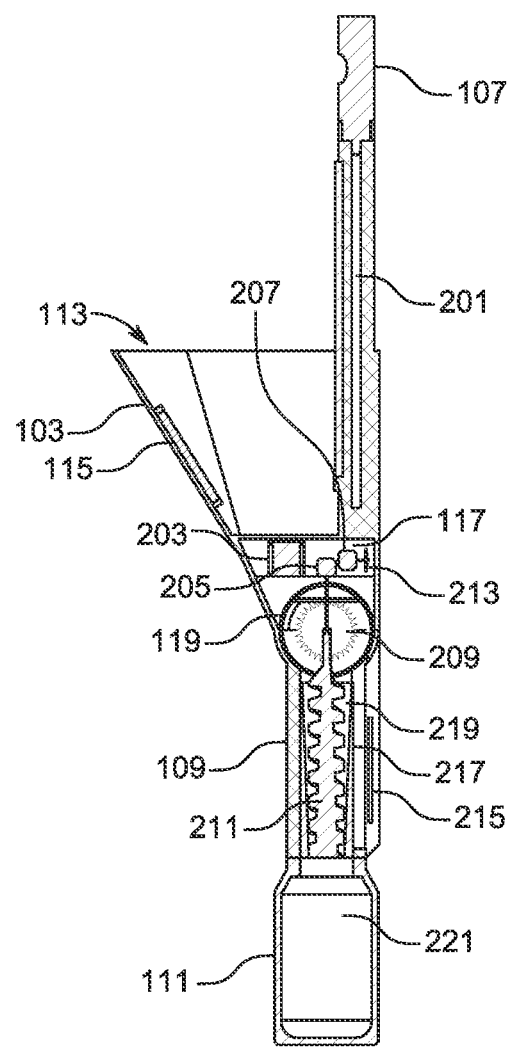
FIG. 2 is a cross-sectional profile view of the fly trap device of FIGS. 1A-1C.

Referring now to FIG. 2, a cross-sectional profile view of the fly trap device 101 is depicted. As shown, the fly trap device 101 includes a tube 201 connecting the oil cartridge 107 to the oil reservoir 123.

As shown, the fly trap device 101 includes a sensor 203, a motor 205, and an air filtration system 207, all of which are housed within the electronic hood 117. The sensor 203 is configured to detect an insect making optimal contact with the one or more electrodes 121. The motor 205 is configured to drive one or more auger gears 209. The one or more auger gears 209 are configured to power the conveyance auger 119 and a grinding auger 211. The air filtration system 207 is configured to filter air while insects are and an interior cavity, the main body housing: and dehydrated. The air filtration system 207 also includes a fan 213. It should be appreciated that the air filtration system 207 provides for improved air quality by eliminating odor produced while insects are and an interior cavity, the main body housing: and dehydrated. In some embodiments, the air filtration system 207 is a replaceable carbon filter cartridge. In other embodiments, the air filtration system 207 is a micro ionizer.

As shown, the fly trap device 101 includes a heating element 215 and an auger casing 217. The heating element 215 is configured to heat the auger casing 217 during dehydration. In the preferred embodiment, the heating element 215 emits heat at a low temperature. The auger casing 217 is configured to house the grinding auger 211. The auger casing 217 includes an interior cavity 219 that tapers inwardly, thereby reducing the volume of the interior cavity 217, thereby reducing the area for grinding insects.

As shown, the disposable pod 111 includes an interior cavity 221 which receives the and an interior cavity, the main body housing: and dehydrated remains of insects.

Referring now to FIG. 3, an exploded view of the fly trap device 101 is illustrated. As mentioned above, the fly trap device 101 includes one or more oil wicks 301. Each oil wick is either positively charged (e.g., oil wick 301a) or negatively charged (e.g., oil wick 301b) based on the arrangement of the one or more oil wicks 301 with the one or more electrodes 121.

As shown, the fly trap device 101 includes a socket 303 configured to removably secure the oil cartridge 107 thereto.

As shown, the fly trap device 101 further includes a vent tube 305 configured to allow air to move towards the air filtration system 207.

It should be appreciated that the fly trap device 101 may vary based on aesthetical, functional, or manufacturing considerations.

It should also be appreciated that one of the unique features believed characteristic of the present application is the use of low voltage alternating current to disable insects and the use of disposal pods to store and confine processed insect remains for clean disposal.

Figure 4:
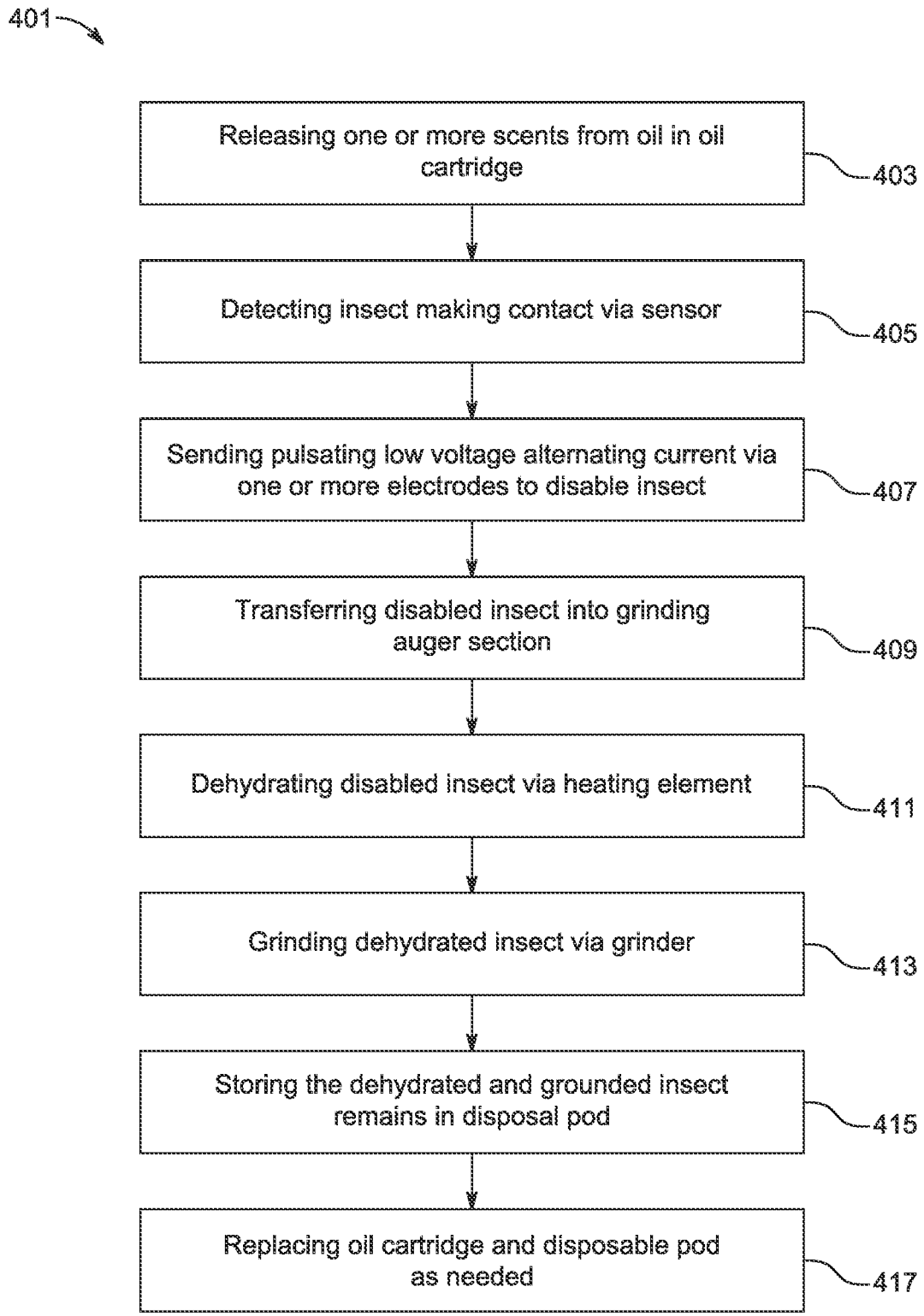
FIG. 4 is a flowchart of a method of use of the fly trap device of FIGS. 1A-1C in accordance with one or more embodiments of the present application.

In FIG. 4, a flowchart 401 depicts a simplified method of use associated with the fly trap device 101. During use, oil within the oil cartridge releases one or more scents to attract insects, as shown with box 403. Upon detection of insect contact via the sensor, pulsating low voltage alternating current is sent via the one or more electrodes for disablement, as shown with boxes 405, 407. The disabled insects are transferred into the grinding auger section for dehydration and grinding, and the insect remains are stored in the disposal pod, as shown with boxes 409-415. The oil cartridge and disposable pod can be replaced as needed, as shown with box 417.

Figure 5:
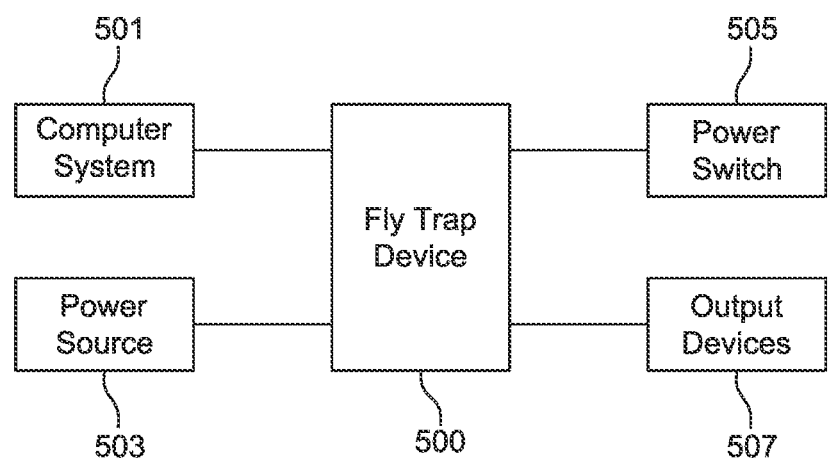
FIG. 5 is a block diagram of the electronic components of a fly trap device in accordance with one or more embodiments of the present application.

In FIG. 5, a block diagram depicts electronic components contemplated for a fly trap device 500. These electronic components include one or more computer systems 501, one or more power sources 503, one or more power switches 505, and one or more output devices 507. The computer system 501 is described in more detail in relation to FIG. 6.

The power source 503 is configured to supply energy to the fly trap device 500. Examples of the power source 503 include, without limitation, a battery, a solar cell, a direct connection to an electrical outlet, other methods, or any combination or multiplicity thereof.

The power switch 505 is configured to turn the power source 503 on and off.

The output device 507 may include a graphical user interface, display, speakers, and the like.

Figure 6:
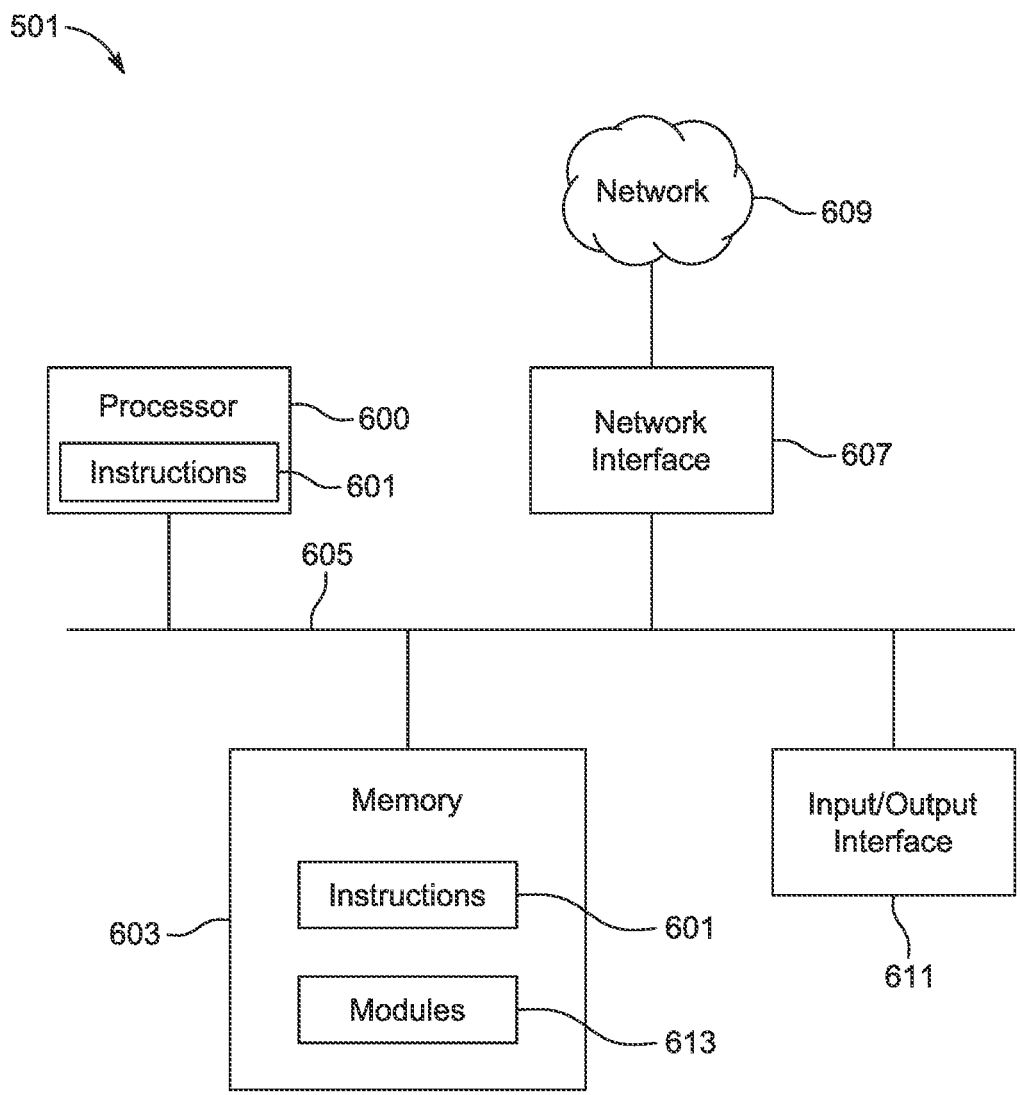
FIG. 6 is a block diagram illustrating an example computer system within which a set of instructions for causing a machine to perform any one or more of the methodologies discussed herein may be executed.

Referring now to FIG. 6, a block diagram of the computer system 501 within which a set of instructions for causing a machine to perform any one or more of the methodologies discussed herein may be executed, is depicted. The computer system 501 may correspond to any of the various computing devices, servers, mobile devices, embedded systems, or computing systems presented herein.

The computer system 501 may be implemented as any of a variety of conventional computing devices, including, for example, a desktop computer, a laptop, a tablet, a phablet, a workstation, an embedded controller, a server, a mobile device, a smartphone, an entertainment device, a printing machine (also referred as a printer or a printing device), a set-top box, a kiosk, a vehicular information system, one or more processors associated with a television, a customized machine, any other hardware platform, or any combination or multiplicity thereof. The computer system 601 may be a distributed system configured to function using multiple computing machines interconnected via a data network or bus system. Further, while only a single machine is illustrated, the term "machine" shall also be taken to include any collection of machines that individually or jointly execute a set (or multiple sets) of instructions to perform any one or more of the methodologies discussed herein.

The computer system 501 includes at least one processor 600 with or without one or more sets of instructions 601, a memory 603 with or without one or more sets of instructions 601, a network interface 607, and an input/output interface 611 which communicate with each other via a bus 605.

The processor 600 may be configured to execute code or instructions to perform the operations and functionality described herein, manage request flow and address mappings, and to perform calculations and generate commands. The processor 600 may be configured to monitor and control the operation of the components in the computer system 501. The processor 600 may be a general purpose processor, a processor core, a multiprocessor, a reconfigurable processor, a microcontroller, a digital processor (DSP), an application specific integrated circuit (ASIC), a graphics processing unit (GPU), a field programmable gate array (FPGA), a programmable logic device (PLD), a controller, a state machine, grated logic, discrete hardware components, any other processing unit, or any combination or multiplicity thereof. The processor 600 may be a single processing unit, multiple processing cores, special purpose processing cores, co-processors, or any combination thereof. In addition, the processor 600 along with other components of the computer system 501 may be a virtualized computing machine executing within one or more other computing machines.

The processor 600 may also be connected to the other elements of the computer system 501 or the various peripherals discussed herein through the bus 605. It should be appreciated that the bus 605 may be within the processor 600, outside the processor 600, or both. In some embodiments, any of the processor 600, the other elements of the computer system 501, or the various peripherals discussed herein may be integrated into a single device, for example, a system on a chip (SOC), system on package (SOP), or application-specific integrated circuit (ASIC) device.

The instructions 601 may reside, completely or at least partially, within the processor 600 and/or memory 603 during execution thereof by the computer system 501. The instructions 601 may include directions for storing instructions, performing one or more functions, and the like. For example, the instructions 601 may include detecting one or more files to perform one or more methodologies described herein. The instructions 601 may be configured to run in sequential order, in parallel (such as under different processing threads) or in a combination thereof. The instructions 601 may further be transmitted or received over the network 609 using a transmission medium, for instance network interface 607, and any one of a number of well-known transfer protocols (e.g., HTTP, HTTPS, FTP, TCP, and the like).

The network interface 607 facilitates communication with other computing systems (not shown) via one or more networks 609. Other computing systems, for example, may include conventional computing devices as described above, internet connected devices/systems, or an external storage such as a server, or a cloud computing system.

The computer system 501 may operate in a networked environment using logical connections through the network interface 607 to one or more other systems or computing machines across the network 609. The network 609 may include wide area networks (WAN), local area networks (LAN), the Internet, intranets, wireless access networks, wired networks, mobile networks, telephone networks, near field communication (NFC), optical networks, or combinations thereof. The network 609 may be packet switched, circuit switched, of any topology, and may use any communication protocol. Communication links within the network 609 may involve various digital or analog communication media, for example, fiber optic cables, free-space optics, waveguides, electrical conductors, wireless links, antennas, radio frequency communications, and the like.

The memory 603 may include volatile memories, for example, random access memory (RAM), static random access memory (SRAM), dynamic random access memory (DRAM), and synchronous dynamic random access memory (SDRAM). Other types of RAM also may be used to implement the memory 603. The memory 603 may also include non-volatile memories, for example, read-only memory (ROM), erasable programmable read-only (EROM), flash memories, or any other device capable of storing program instructions or data with or without applied power. In addition, the memory 603 may include a non-volatile storage device, for example, a hard disk, a floppy disk, an optical disk, a compact disk read only memory (CD-ROM), a digital versatile disc (DVD), a Blu-ray disc, a magnetic tape, a flash memory, other non-volatile memory device, a solid state drive (SSD), any magnetic storage device, any optical storage device, any semiconductor storage device, any physical-based storage device, any other data storage device, or any combination or multiplicity thereof.

The memory 603 may also include one or more modules 613 configured to facilitate the computer system 501 with performing the methodologies described herein. The module 613 may include one or more sets of instructions 601 stored as software or firmware in association with the memory 603. The memory 603 may therefore represent examples of machine or computer readable media on which instructions or code may be stored for execution by the processor 600. Machine or computer readable media may generally refer to any medium or media used to provide instructions to the processor 600. Such machine or computer readable media associated with the module 613 may comprise a computer software product. It should be appreciated that a computer software product comprising the module 613 may also be associated with one or more processes or methods for delivering the module 613 to the computer system 501 via the network 609, any signal-bearing medium, or any other communication or delivery technology. The module 613 may also comprise hardware circuits or information for configuring hardware circuits, for example, microcode or configuration information for a FPGA or other PLD.

The input/output (I/O) 611 may couple the computer system 501 to various input devices including keyboards, mice, touchscreens, touchpads, trackballs, joysticks, cameras, microphones, scanners, electronic digitizers, sensors, receivers, wireless remotes, and any other pointing devices, or any combination thereof. The I/O 611 may couple the computer system 501 to various output devices including video displays, speakers, printers, projectors, tactile feedback devices, automation control, robotic components, actuators, motors, fans, solenoids, valves, pumps, transmitters, signal emitters, lights, and the like.

Figure 7:
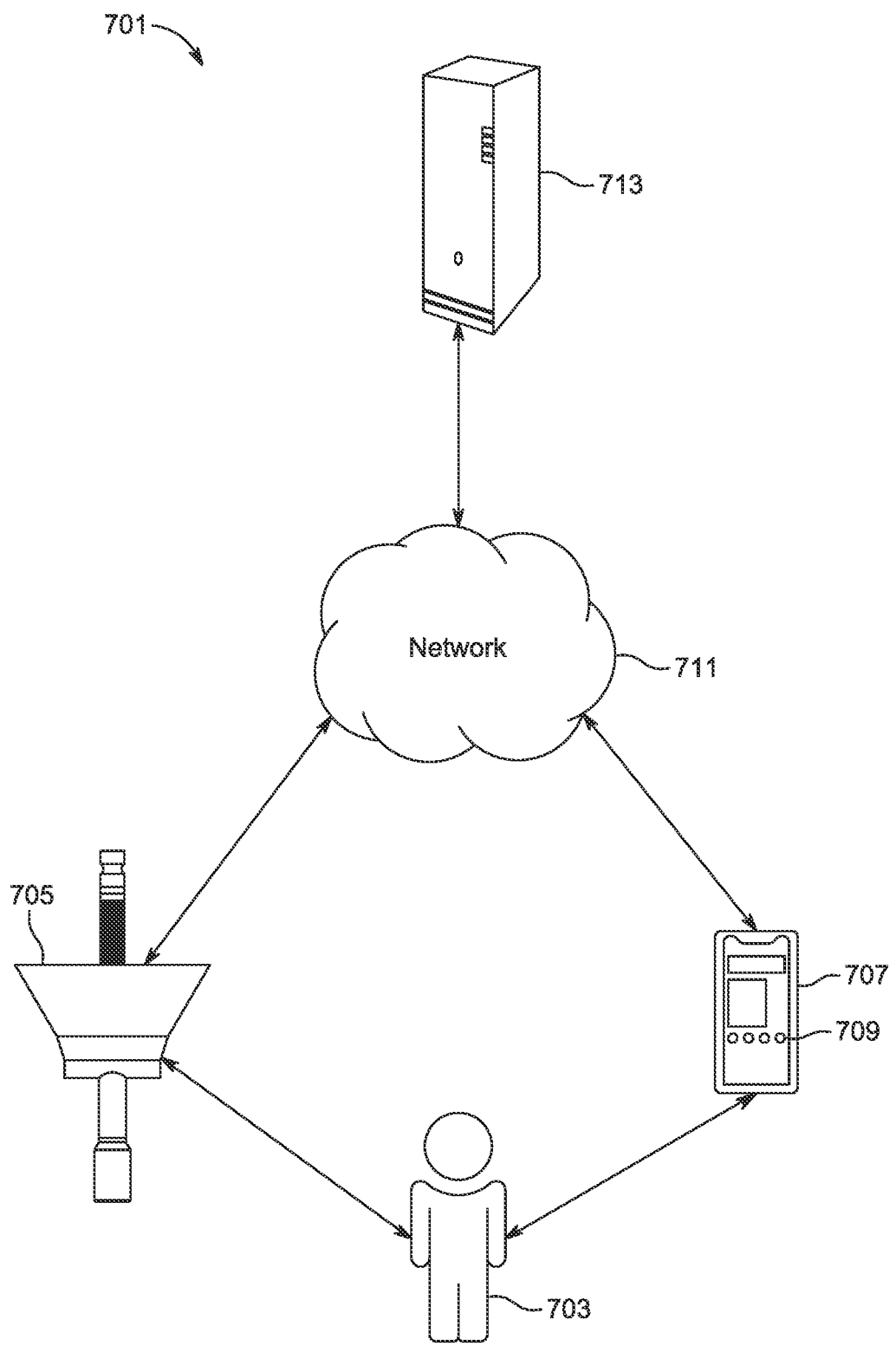
FIG. 7 is a conceptual schematic of a fly trap system in accordance with one or more embodiments of the present application.

In FIG. 7, a conceptual schematic of a fly trap system 701 is illustrated. As shown, a user 703 may interact directly with a fly trap device 705. It should be appreciated that the fly trap device 705 may be the fly trap device 101 of FIGS. 1A-1C, the fly trap device of FIG. 8 (discussed further below), or a combination thereof. In some examples, the user 703 may place the fly trap device 705 in a desired area (e.g., kitchen, backyard, patio, etc.), change out the oil cartridge, change out the bait sticks, remove the disposal pod, remove the collection tray, or the like. The user 703 may also engage with a computing device 707 to interact with a user interface 709 to facilitate communication with the fly trap device 705 via a network 711.

As shown, the fly trap device 705 may be in communication with a server/database 713 via the network 711. In some embodiments, the fly trap device 705 sends data associated with the volume level of oil or bait and the quantity of insects caught in real time to the server/database 713. The user 703 can retrieve this data by interacting with the user interface 709, by physically engaging with the fly trap device 705, or both.

In other embodiments, the user 703 can interact with the user interface 709 to create an account that enables them to purchase and receive replacement parts (e.g., oil cartridges, disposal pods, bait sticks, etc.) in timely intervals, as needed, automatically, or the like.

The computing device 707 may correspond to one or more personal computers, laptop computers personal digital assistants, tablet computers, mobile phones, portable media players, digital media receivers, set-top boxes, kiosks, video game consoles, printers, scanners, any other network-enabled electronic devices, or any combination or multiplicity thereof.

The user interface 709 may be incorporated into any type of software application, including, without limitation, desktop applications, mobile applications, and web-based applications to enable users to interact with and control the applications. In addition, the user interface 709 may access a server/database 713 via the network 711 using a software application, a browser application, a web browser, a webpage, a website, or any combination or multiplicity thereof.

The network 711 includes one or more wired telecommunications, wireless telecommunications, or any combination or multiplicity thereof by which the computing device 707 may exchange data. The network 711 may include, for example, one or more of a local area network (LAN), a wide area network (WAN), an intranet, an Internet, a public switched telephone network (PSTN), a metropolitan area network (MAN), a cellular or other mobile communication network, a BLUETOOTH® wireless technology connection, a wireless local area network (WLAN), a virtual private network (VPN) a near field communication (NFC) connection, and any combination or multiplicity thereof.

The server/database 713 is configured to manage network resources, store information, data processing, and the like needed to implement the methodologies discussed herein. It should be appreciated that the server/database 713 includes one or more servers, for example, a web server, an application server, a database server, and any combination or multiplicity thereof to apply the current invention. In addition, it should be appreciated that the server/database 713 includes one or more databases, for example, a structural query language (SQL) databases or other relational database, a flat or hierarchical structure of files, a single flat-file store, a key-value mapping system, or other forms of data storage known to those of ordinary skill in the art.

The server/database 713 may also be configured to store, retrieve, and send computer files and data to other computing devices (not shown) on the network 711. The server/database 713 may also be configured to control the storage, organization, and retrieval of data and information associated with the fly trap device 705 as well as execute various operations and functions associated with the fly trap device 705.

Figure 8:
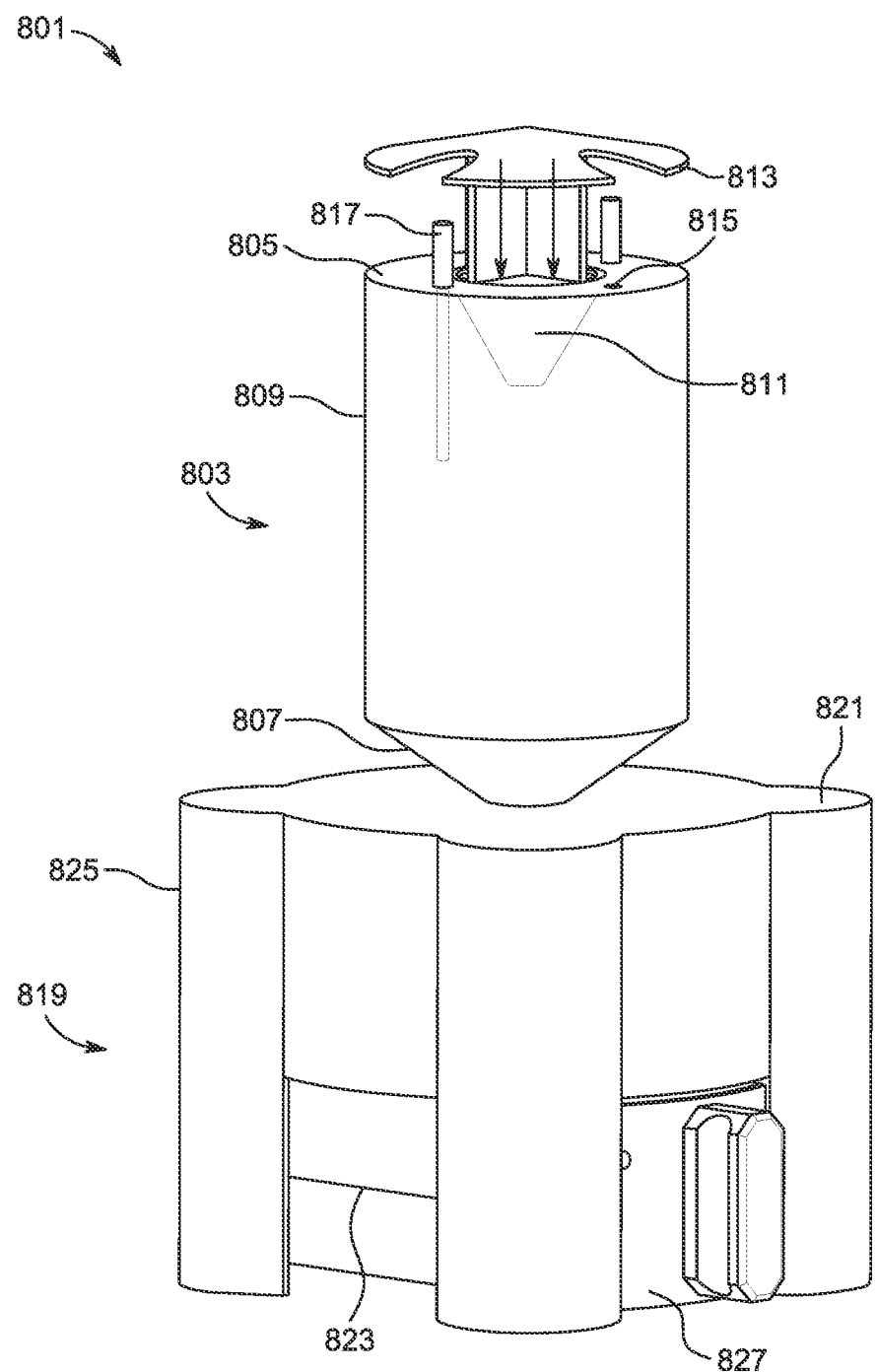
FIG. 8 is a perspective view of an alternative fly trap device in accordance with one or more embodiments of the present invention.
Figure 9:
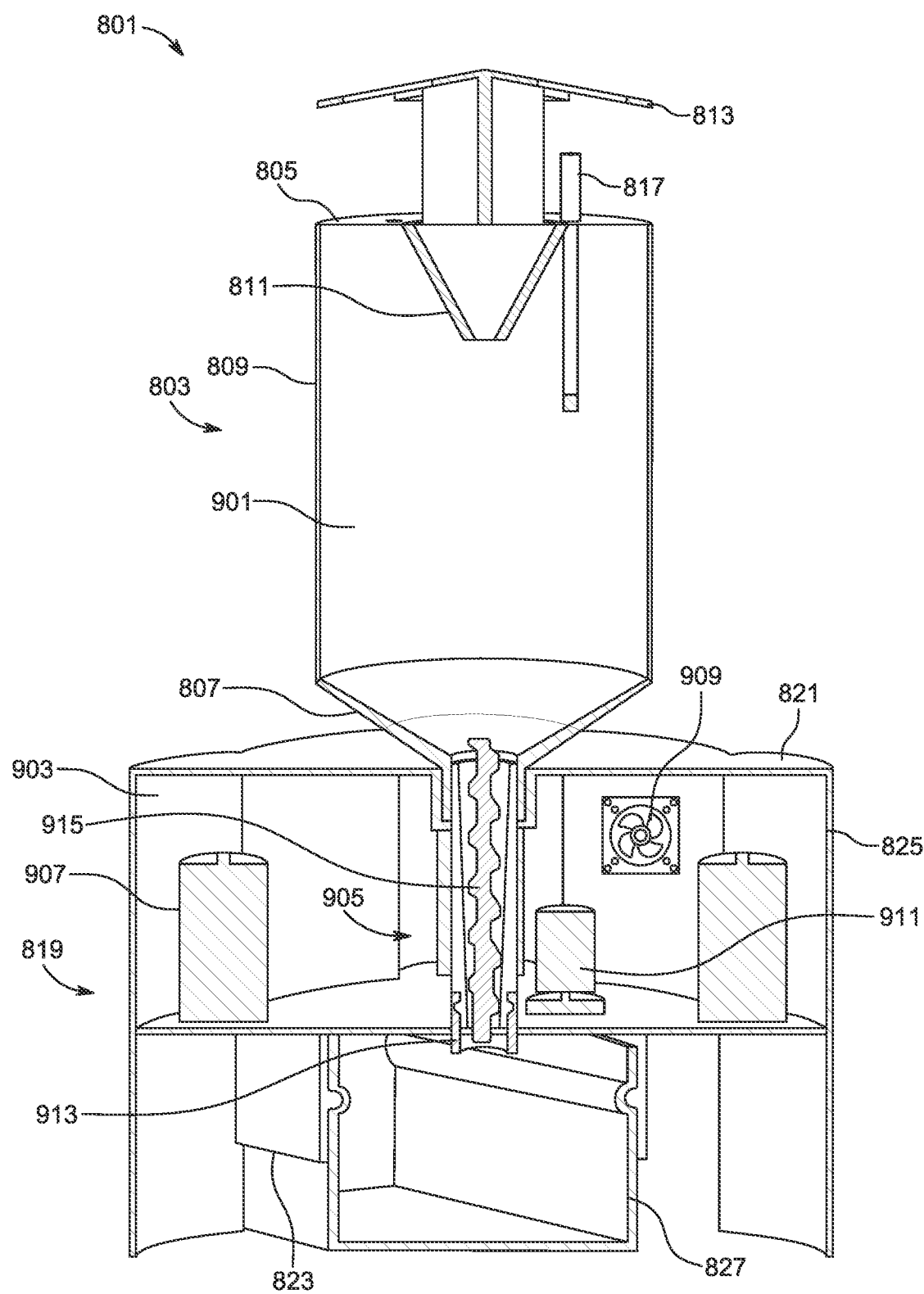
FIG. 9 is a cross-sectional profile view of the fly trap device of FIG. 8.

Referring now to FIGS. 8 and 9, various views of an alternative fly trap device 801 are depicted. It should be appreciated that the fly trap device 801 may vary based on aesthetical, functional, or manufacturing considerations.

As shown, the fly trap device 801 includes a trap body 803 having a relatively horizontal top portion 805, a conical shaped bottom portion 807, and a cylindrical sidewall 809 defining an interior cavity 901. It should be appreciated that the trap body 803 can be formed in any suitable shape, such as circular (as illustrated), square, rectangular, or other polygonal shapes.

The top portion 805 includes a conical shaped passageway 811 for insect entry into the interior cavity 901, as shown with directional arrows. The passageway 811 also includes a rain deflector 813 to prevent rain from entering into the passageway 811. It should be appreciated that the passageway 811 prevents insects from escaping once they are within the interior cavity 901.

The top portion 805 further includes one or more openings 815 for the insertion of one or more bait sticks 817. In the preferred embodiment, the one or more bait sticks 817 can contain various scents to attract various insects such as mosquitos, wasps, flies, and the like.

The fly trap device 801 also includes a main body 819 having a top portion 821, a bottom portion 823, and one or more side walls 825 defining an interior cavity 903. The trap body 803 removably couples to the top portion 821 of the main body 819 via its bottom portion 807. In addition, the main body 819 houses a grinding auger section 905, one or more batteries 907, a fan 909, and a removable collection tray 827.

The grinding auger section 905 is configured to grind and dehydrate insects trapped within the interior cavity 901 of the trap body 803. The grinding auger section 905 extends downwardly into the interior cavity 903 of the main body 819 and into the collection tray 827. It should be appreciated that the fan 909 aids in the spreading of the scent released from the one or more bait sticks 817. In addition, it should be appreciated that the fan 909 provides for ventilation of the main body 819.

The fly trap device further includes a motor 911, one or more gears 913, and a grinding auger 915. The motor 911 is configured to drive the one or more auger gears 913 which in turn power the grinding auger 915.

It should be appreciated that during use, the one or more bait sticks 817 release scents to lure insects into the trap body 803 via the passageway 811. The trapped insects are then grounded and dehydrated via the grinding auger section 905 and the insect remains are stored in the collection tray 827 for later disposal.

Figure 10:
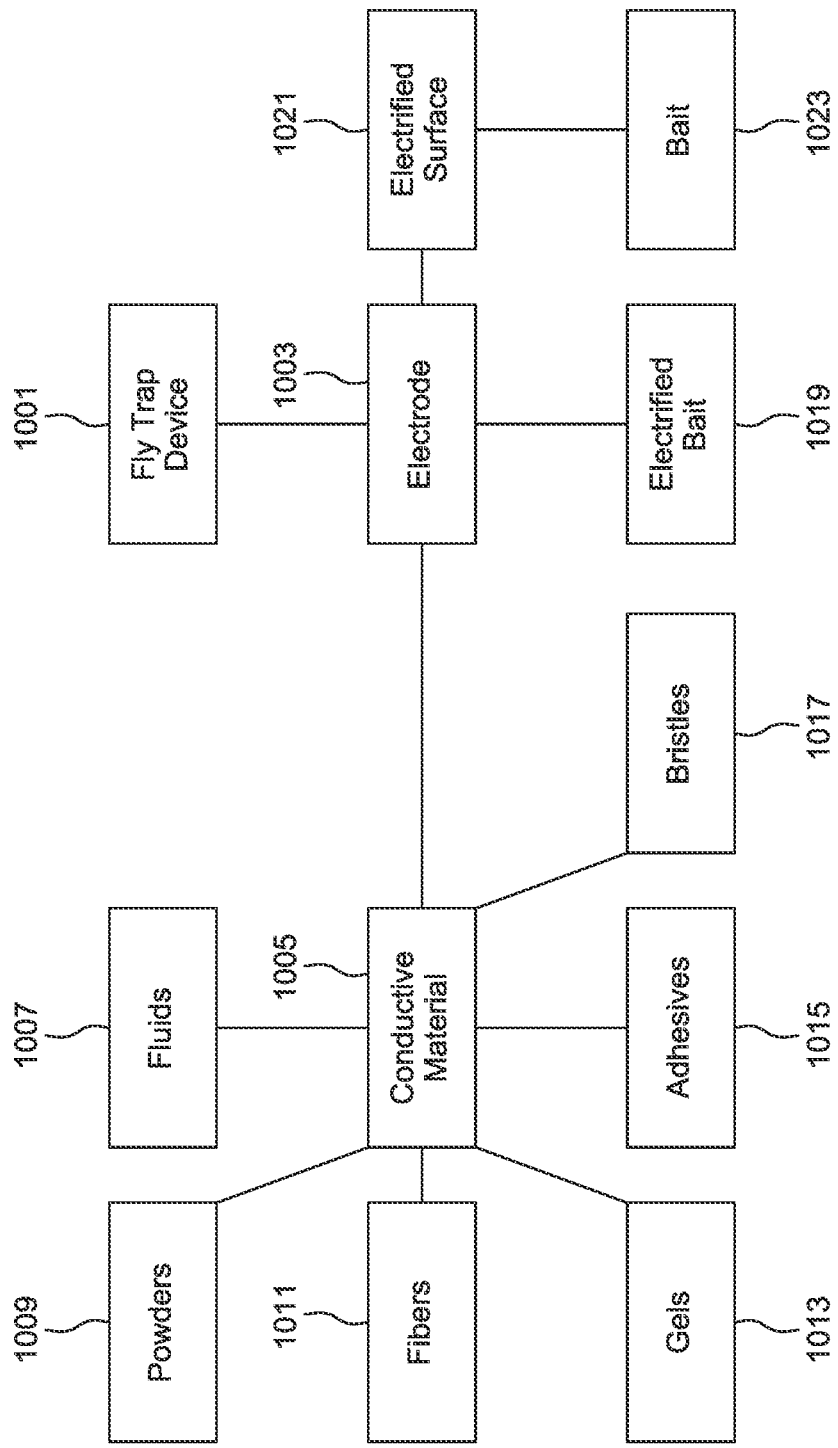
FIG. 10 is a block diagram of features associated with an electrode of a fly trap device in accordance with one or more embodiments of the present application.

Referring now to FIG. 10, a block diagram of features associated with an electrode 1003 of a fly trap device 1001 is illustrated. It will be appreciated that the fly trap device 1001 may be the same fly trap device shown in FIGS. 1A through 1C. In addition, the electrode 1003 may correspond to a plurality of electrodes.

In some embodiments, the electrode 103 may include one or more conductive materials 1005 to increase the contact area between the electrified contacts and an insect's surface areas. It should be appreciated that the one or more conductive materials 1005 help facilitate current penetration into an insect's exoskeleton and thus, bypass the nonconductive hairs and extremities of the insect's legs and body. The one or more conductive materials 1005 may be fluids 1007, powders 1009, fibers 1011, gels 1013, adhesives 1015, and bristles 1017. In other embodiments, fluids 1007 can be liquids, oils or a combination thereof.

It is contemplated and will be appreciated that the placement of the one or more conductive materials 1005 in relation to the electrode 1003 may vary. For example, the one or more conductive materials 1005 may be placed directly on the electrode 1003, in contact with the electrode 1003, in and/or on other material on the electrode 1003, in a tray with the electrode 1003, or on a surface that is electrically charged.

In alternative embodiments, the electrode 1003 may include an electrified bait 1019, an electrified surface 1021 with bait 1023, or both. The electrified bat 1019 and the electrified surface 1021 with bait 1023 create an electric current between the insect's mouth (including parts on, in and around the mouth) and the electrode 1003, thereby improving conductivity between the insect and the electrode 1003.

It is contemplated and will be appreciated that the placement of the electrified bait 1019, the electrified surface 1021 with bait 1023, or both in relation to the electrode 1003 may vary. For example, the electrified bait 1019, the electrified surface 1021 with bait 1023, or both may be infused in a liquid or gel, in contact with the electrode 1003, coated on the electrode 1003, coated on other material on the electrode 1003, in a tray with the electrode 1003, or on a surface that is electrically charged.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A fly trap device, comprising:
a trap body having a relatively horizontal top portion, a conical shaped bottom portion, a cylindrical sidewall, and an interior cavity, wherein the top portion includes a conical shaped passageway configured to allow entry of insects therethrough and one or more openings configured to allow one or more bait sticks to insert therethrough, wherein the passageway further comprises a rain deflector to prevent rain from entering therethrough, and wherein the one or more bait sticks contain one or more scents to attract insects;
a main body having a top portion, a bottom portion, one or more sidewalls, and an interior cavity, the main body housing:
a grinding auger section configured to grind and dehydrate insects trapped within the interior cavity of the trap body;
a grinding auger;
a motor configured to drive one or more auger gears, the one or more auger gears configured to the grinding auger;
one or more power sources;
a power switch;
a fan configured to aid in the spreading of the one or more scents of the one or more bait sticks and configured to provide ventilation for the main body; and
a removable collection tray;
wherein the trap body removably couples to the main body.

2. The fly trap device of claim 1, further comprising:
a heating element configured to emit heat at a low temperature;
an interior cavity;
a light source;
an air filtration system configured to eliminate odor;
a vertical column extending upwardly from the interior cavity, the vertical columns configured to house one or more electrodes, one or more oil wicks, and an oil reservoir therein, wherein the one or more electrodes are configured to deliver low voltage alternating current, wherein the one or more oil wicks are in direct communication with the one or more electrodes;
a sensor configured to detect a presence of an insect on the one or more electrodes;
an oil cartridge removably coupled to a top portion of the vertical column via a socket, the oil cartridge configured to house oil therein; and
a disposal pod removably coupled to a bottom portion of the grinding auger section, the disposal pod configured to store insect remains after insects are grounded and dehydrated within the grinding auger section.

3. The fly trap system of claim 2, wherein the one or more oil wicks include liquid wicks, fluid wicks, or a combination thereof.

4. The fly trap system of claim 2, wherein the oil cartridge includes liquid cartridge, fluid cartridge, or a combination thereof.

5. The fly trap device of claim 2, wherein the one or more electrodes further comprises:
one or more conductive materials, an electrified bait, an electrified surface with bait, or a combination thereof;

wherein the one or more conductive materials provide for increase contact area between the one or more electrodes and an insect's surface areas;

wherein the electrified bait facilitates an electric current between an insect's mouth and the one or more electrodes; and wherein the electrified surface with bait facilitates an electric current between an insect's mouth and the one or more electrodes.

6. A fly trap system for trapping insects and processing said trapped insects for storage and disposal, comprising:

a fly trap device, the fly trap device comprising:

a trap body having a relatively horizontal top portion, a conical shaped bottom portion, a cylindrical sidewall, and an interior cavity;

wherein the top portion includes a conical shaped passageway configured to allow entry of insects therethrough and one or more openings configured to allow one or more bait sticks to insert therethrough;

wherein the passageway further comprises a rain deflector to prevent rain from entering therethrough; and wherein the one or more bait sticks contain one or more scents to attract insects;

a main body having a top portion, a bottom portion, one or more sidewalls, and an interior cavity, the main body housing:

a grinding auger section configured to grind and dehydrate insects trapped within the interior cavity of the trap body;

a grinding auger;

a motor configured to drive one or more auger gears, the one or more auger gears configured to the grinding auger;

one or more power sources;

a power switch;

a fan configured to aid in the spreading of the one or more scents of the one or more bait sticks and configured to provide ventilation for the main body; and a removable collection tray;

wherein the trap body removably couples to the main body; and at least one computer system in communication with the fly trap device, the at least one computer system having:

one or more communication interfaces, the interfaces including an input device and a display device;

one or more communication components receiving data and information via one or more networks;

one or more processors for executing computer-executable instructions; and one or more memories for storing computer-executable instructions that when executed by the one or more processors cause the at least one computer system to perform steps comprising:

monitoring bait volume within the one or more bait sticks in real time;

monitoring quantity of trapped insects within the removable collection tray in real time;

transmitting a report to one or more users of the bait volume within the one or more bait sticks in real time;

transmitting a report to one or more users of the quantity of trapped insects within the removable collection tray in real time; and allowing the one or more users to purchase and receive replacement bait sticks in timely intervals, as needed, or automatically.

7. The fly trap system of claim 6, wherein the one or more memories for storing computer-executable instructions that when executed by the one or more processors cause the at least one computer system to perform steps further comprising:

monitoring oil volume within the oil cartridge in real time;

monitoring quantity of trapped insects within the disposal pod in real time;

transmitting a report to one or more users of the oil volume within the oil cartridge in real time;

transmitting a report to one or more users of the quantity of trapped insects within the disposal pod in real time; and allowing the one or more users to purchase and receive replacement oil cartridges and disposal pods in timely intervals, as needed, or automatically.

8. The fly trap system of claim 6, further comprising:

a heating element configured to emit heat at a low temperature;

an interior cavity;

a light source;

a conveyance auger configured to transport trapped insects to the grinding auger section;

an air filtration system configured to eliminate odor;

a vertical column extending upwardly from the interior cavity, the vertical columns configured to house one or more electrodes, one or more oil wicks, and an oil reservoir therein, wherein the one or more electrodes are configured to deliver low voltage alternating current, wherein the one or more oil wicks are in direct communication with the one or more electrodes;

a sensor configured to detect a presence of an insect on the one or more electrodes;

an oil cartridge removably coupled to a top portion of the vertical column via a socket, the oil cartridge configured to house oil therein; and a disposal pod removably coupled to a bottom portion of the grinding auger section, the disposal pod configured to store insect remains after insects are grounded and dehydrated within the grinding auger section.

9. The fly trap system of claim 8, wherein the one or more oil wicks include liquid wicks, fluid wicks, or a combination thereof.

10. The fly trap system of claim 8, wherein the oil cartridge includes liquid cartridge, fluid cartridge, or a combination thereof.

11. The fly trap system of claim 8, wherein the one or more electrodes further comprises:

one or more conductive materials, an electrified bait, an electrified surface with bait, or a combination thereof;

wherein the one or more conductive materials provide for increase contact area between the one or more electrodes and an insect's surface areas;

wherein the electrified bait facilitates an electric current between an insect's mouth and the one or more electrodes; and wherein the electrified surface with bait facilitates an electric current between an insect's mouth and the one or more electrodes.

12. A method for trapping insects and processing said trapped insects for storage and disposal, the method comprising:

providing a fly trap device, the fly trap device comprising:

a trap body having a relatively horizontal top portion, a conical shaped bottom portion, a cylindrical sidewall, and an interior cavity, wherein the top portion includes a conical shaped passageway configured to allow entry of insects therethrough and one or more openings configured to allow one or more bait sticks to insert therethrough, wherein the passageway further comprises a rain deflector to prevent rain from entering therethrough, and wherein the one or more bait sticks contain one or more scents to attract insects;

a main body having a top portion, a bottom portion, one or more sidewalls, and an interior cavity, the main body housing:

a grinding auger section configured to grind and dehydrate insects trapped within the interior cavity of the trap body;

a grinding auger;

a motor configured to drive one or more auger gears, the one or more auger gears configured to the grinding auger;

one or more power sources;

a power switch;

a fan configured to aid in the spreading of the one or more scents of the one or more bait sticks and configured to provide ventilation for the main body; and a removable collection tray;

wherein the trap body removably couples to the main body;

attracting insects with one or more bait sticks;

dehydrating and grinding insects within the grinding auger section; and storing dehydrated and grounded insect remains in the collection tray.

13. The method of claim 12, wherein the fly trap device further comprises:

a heating element configured to emit heat at a low temperature;

an interior cavity;

a light source;

an air filtration system configured to eliminate odor;

a vertical column extending upwardly from the interior cavity, the vertical columns configured to house one or more electrodes, one or more oil wicks, and an oil reservoir therein, wherein the one or more electrodes are configured to deliver low voltage alternating current, wherein the one or more oil wicks are in direct communication with the one or more electrodes;

a sensor configured to detect a presence of an insect on the one or more electrodes;

an oil cartridge removably coupled to a top portion of the vertical column via a socket, the oil cartridge configured to house oil therein; and a disposal pod removably coupled to a bottom portion of the grinding auger section, the disposal pod configured to store insect remains after insects are grounded and dehydrated within the grinding auger section.

14. The method of claim 13, wherein the one or more oil wicks include liquid wicks, fluid wicks, or a combination thereof.

15. The method of claim 13, wherein the oil cartridge includes liquid cartridge, fluid cartridge, or a combination thereof.

16. The method of claim 13, wherein the one or more electrodes further comprises:

one or more conductive materials, an electrified bait, an electrified surface with bait, or a combination thereof;

wherein the one or more conductive materials provide for increase contact area between the one or more electrodes and an insect's surface areas;

wherein the electrified bait facilitates an electric current between an insect's mouth and the one or more electrodes; and wherein the electrified surface with bait facilitates an electric current between an insect's mouth and the one or more electrodes.

17. The method of claim 12, further comprising:

releasing one or more scents to attract insects;

detecting, by the sensor, an insect in contact;

pulsating, by the one or more electrodes, low voltage alternating current for insect disablement;

transferring disabled insects into the grinding auger section for dehydration and grinding;

filtering air, by the air filter system, to eliminate odor produced during dehydration and grinding; and storing dehydrated and grounded insect remains in the disposal pod.

* * * * *